United States Patent [19]

Livits

[11] Patent Number: 4,846,598
[45] Date of Patent: Jul. 11, 1989

[54] ONE-HANDED KEYBOARD

[76] Inventor: Eric A. Livits, 97-03 71st St., Forest Hills, N.Y. 11375

[21] Appl. No.: 135,609

[22] Filed: Dec. 21, 1987

[51] Int. Cl.⁴ .............................. B41J 5/10; B41J 5/28
[52] U.S. Cl. .................................. 400/472; 400/255; 400/485
[58] Field of Search ............... 400/472, 485, 486, 489, 400/255, 261, 100, 492

[56] References Cited

U.S. PATENT DOCUMENTS

| | | | |
|---|---|---|---|
| 2,532,228 | 11/1950 | Hesh | 400/485 |
| 4,067,431 | 1/1978 | Whitaker | 400/485 |
| 4,201,489 | 5/1980 | Zapp | 400/485 |
| 4,516,939 | 5/1985 | Crimmins, Jr. | 400/489 X |

FOREIGN PATENT DOCUMENTS

| | | | |
|---|---|---|---|
| 0213022 | 3/1987 | European Pat. Off. | 400/485 |
| 308048 | 9/1916 | Fed. Rep. of Germany | |
| 2587815 | 3/1987 | France | 400/472 |
| 01345 | 4/1982 | PCT Int'l Appl. | |

OTHER PUBLICATIONS

IBM Technical Disclosure Bulletin, "Keyboard for Handheld Computer", vol. 27, No. 10A (Mar. 1985), pp. 5643–5645.
McCornack, W. C., "Single Keybutton Four—Way Switch", IBM Technical Disclosure Bulletin, vol. 21, No. 8 (Jan. 1979), p. 3261.
Bequaert, F. C., "Portable High Speed Keyboard", IBM Technical Discloure Bulletin, vol. 23, No. 7A (Dec. 1980), p. 3016.
"Changeable Key Pad Overlay and Key Pad Panel", IBM Technical Disclosure Bulletin, vol. 29, No. 5 (Oct. 1986), p. 2199.

Primary Examiner—Edgar S. Burr
Assistant Examiner—James Lisehora
Attorney, Agent, or Firm—Lilling & Greenspan

[57] ABSTRACT

A one-handed keyboard is disclosed which includes a stationary base and a rocking keyboard which is mounted for rocking movement between a normal level position and right and left depressed positions. A selector key is mounted on the rocking keyboard for rocking therewith and also being pivotally mounted for movement between a normal upper or raised position and a lower postion to which it moves when the user rests the palm of his hand on it. A cluster of keys is provided, each of which is multi-function representing a plurality of alpha-numeric characters and/or symbols that can be typed or entered by selective actuation of the character keys, rocking keyboard, selector key and a shift key by movements of one hand and movements of the fingers thereof.

11 Claims, 2 Drawing Sheets

ONE-HANDED KEYBOARD

BACKGROUND OF THE INVENTION

1. Field of the Invention

The present invention generally relates to typewriter and data input devices, and more specifically, to a one-handed keyboard.

2. Description of the Prior Art

Numerous keyboards for typewriters and the like and data entry devices have been proposed. In a first class of such devices, the total number of keys are greatly reduced from the number typically found on a typewriter or computer keyboard. Such devices, however, contemplate the use of both hands. To achieve such result, each of the keys are normally arranged in one large cluster or two small clusters--one for each hand--with each key representing a multi-function key which can be actuated to generate two or more alphanumeric characters or symbols. Patents which disclose devices in this category are typified by the following: U.S. Pat. No. 2,532,228 to Hesh for an electrically operated typewriter; U.S. Pat. No. 4,449,839 to Bleuer for a keyboard with elongated keys; U.S. Pat. No. 3,633,724 to Samuel for electric typewriter and keyboard arrangement; and U.S. Pat. No. 4,067,431 to Whitaker for a combinational keyboard. Other devices disclosing multi-function keys are disclosed in U.K. Pat. No. 2,064,187 to Eilam for a chordic keyboard and U.S. Pat. No. 345,565 to Baldrige.

There have also been proposed a number of small hand-held keyboards. For example, a keyboard for a hand-held computer is disclosed in IBM Technical Disclosure Bulletin of Vol. 27, No. 10A, March 1985, where a hand-held computer keyboard is disclosed which can be actuated by the fingers of one hand while the computer is held in the palm of the hand. In U.S. Pat. No. 4,253,774 to Hanakata et al., an information output device is disclosed wherein a keyboard includes keys corresponding to the characters to be reproduced and for the selection of characters. This output device is sufficiently small that it can be worn on one hand, like a watch, and actuated or operated by the other hand.

Numerous designs have also been proposed for single handed use. Such a device, for example, a disclosed in U.S. Pat. No. 725,855 to Loyd. This patent discloses a typewriter which can be worn on a person's arm and operated by the other arm. A hand-held data input device is disclosed in IBM Technical Disclosure Bulletin Vol. 26, No. 11, April, 1984, which is in the nature of a pistol-grip hand-held device. In Siebel et al U.S. Pat. No. 3,022,878, a communication device is disclosed wherein each finger of a user's hand is engaged with a separate multi-position switch. By moving the tips of each of the individual fingers, therefore, different code or characters can be generated. In International Publication No. WO82/01345 of Croczynski, a hand-bound keyboard is disclosed which is actuatable by the fingers of the operator. The keyboard may be actuated without any hand or arm movement of the operator, means being provided for immobilizing the keyboard with respect to the palm and back of the hand while letting the fingers free to move. Each key is arranged so as to be actuated by a single finger. Also, illustrative of this art is German Pat. No. 308,048 to Mamerow. The device in the aforementioned German patent is a hand-held multi-key device which can be selectively actuated by the five fingers of the hand. No movements of the hand are involved.

Finally, simplified keyboards have been disclosed which utilized hand rests to provide the user with a place to rest his hands during typing. Such keyboards are disclosed in U.S. Pat. Nos. 4,081,068 and 4,201,489 to Zapp. In these patents, a hand rest is disclosed for the ball of the thumb or wrist of the hand, on which the hand of the operator can rest continuously to support his hand during actuation of the keyboard. Means are provided for adjusting the positions of the hand rests to dispose the finger tips of the fingers in natural dispositions in relation to the keys to be actuated, without being tensioned.

Thus, while the prior art has disclosed multi-function keyboards and small, hand-held or single hand devices, the number of alpha numeric characters, symbols and/or functions which have been attainable has been limited. There is a practical limit on the number of characters or functions that can be accessed by five fingers of one hand. The purpose of the present invention is to substantially increase the number of alpha-numeric characters and/or functions which are accessible by one hand so as to provide a full-function typewriter and/or computer data input terminal, without sacrificing simplicity of use and speed of operation.

SUMMARY OF THE INVENTION

One object of the present invention is to provide a full function one-handed keyboard.

Another object of the present invention is to provide a one-handed keyboard which is simple in construction and inexpensive to manufacture.

It is still another object of the present invention to provide a one-handed keyboard which is simple and efficient to use.

It is yet another object of the present invention to provide a one-handed keyboard which is quick to clear and easy to use without looking at the keyboard.

It is a further object of the present invention to provide a one-handed keyboard of the type under discussion which includes at least one cluster of keys each of which keys controls up to eight alpha-numeric characters and/or symbols.

It is yet a further object of the present invention to provide a one-handed keyboard which is actuated both by movements by the fingers of the one hand as well as substantially orthogonal movement of the palm of the hand.

In order to achieve the above objects, as well as others which will become apparent hereafter, a one-handed keyboard in accordance with the present invention includes a stationary base which defines a longitudinal axis generally parallel to the direction of the hand and fingers of the user during use and a transverse axis generally orthogonal to said longitudinal axis. A rocking keyboard is provided which is pivotally mounted on said base for rocking movements about said longitudinal axis between a normal and generally level position and right and left depressed positions. A cluster of character keys is provided on said rocking keyboard actuatable by the tips of the index, middle and ring fingers of the use. A selector pivotally mounted for generally vertical select movements about said transverse axis between a normal upper position and a lower position in response to release and depression, respectively, of said selector key by the palm of user's hand. A shift key is provided on said rocking keyboard arranged to be actuated by the thumb for movements between a normal relaxed position and an actuated engaged position, each of said cluster of keys being multi-function keys representing a plurality of alpha-numeric characters and/or symbols that can be typed or entered by selective actuation of said character keys, rocking keyboard, selector key and shift key by movements of one hand and movements of the fingers thereof.

BRIEF DESCRIPTION OF THE DRAWINGS

The foregoing and other advantage of the invention will become apparent from the ensuing disclosure in which a preferred embodiment of the invention is described in detail and illustrated in the accompanying drawings.

DESCRIPTION OF THE PREFERRED EMBODIMENT

Figure 1:
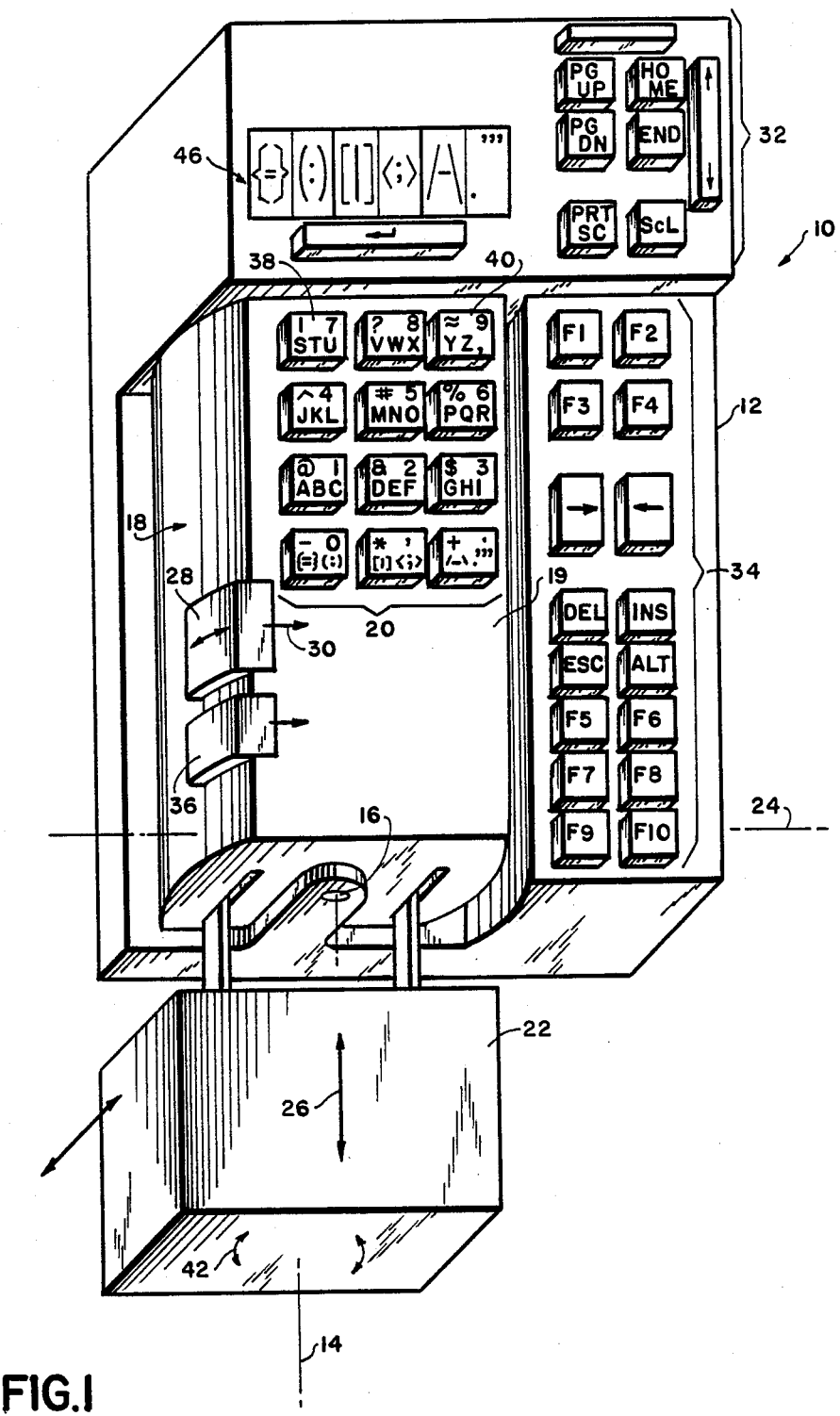
FIG. 1 is a perspective view of the one-handed keyboard in accordance with the present invention, showing all of the keys and other elements in their normal positions or conditions.

Referring now specifically to the figures, and first referring to FIG. 1, a one-handed keyboard in accordance with the present invention is generally designated by the reference numeral 10.

The keyboard 10 includes a stationary base 12 which defines a longitudinal axis 14 generally parallel to the direction of the hand and the fingers of the user during use, as shown. The longitudinal axis 14 is defined by a pivot shaft or pin 16 for mounting a rocking keyboard 18 which is pivotally mounted on the base 12 for rocking movement about the longitudinal axis 14 between a normal generally level position, as shown, and right and left depressed positions. The rocking keyboard 18 is provided with a generally horizontal planar surface 19.

A cluster of generally vertically actuable character keys 20 is provided on the rocking keyboard 18 which are actuatable by the tips of the index, middle and ring fingers of the user. The character keys 20 are at least partially arranged on the surface 19. The cluster of keys at 20 is shown to consist of 12 keys arranged in three rows and four columns. The arrangement is not unlike the arrangement of keys on a calculator keypad.

A selector key 22 which is provided on the rocking keyboard 18 for sharing the rocking movements thereof and further being pivotally mounted for generally vertical selector movements about a transverse axis 24 which is generally orthogonal to the longitudinal axis 14. The selector key 22 is movable between a normal up position, as shown, and a lower position in response to release and depression, respectively, of the selector key 22 on the rocking keyboard by the palm of the user's hand. The selector key 22 is positioned to be actuated by and to support the palm of the user's hand. For that purpose, the selector key 22 may be moved closer to and further away from the rocking keyboard 18, as suggested by the arrow 26, to accommodate the size of the user's hand, and to facilitate the reaching and actuation of the individual keys on the keyboard cluster 20 when the palm of the hand is positioned substantially above the selector key 22. Any suitable mechanical means may be used for making the aforementioned adjustment. See, for example, the arrangement made by ZAP in U.S. Pat. No. 4,201,489, FIG. 2, where one possible mechanical arrangement is illustrated.

A shift key 28 is provided on the rocking keyboard 18 which is arranged to be actuated by the thumb of the user for movements between a normal relaxed position, as shown, and an actuated engaged position, suggested by the arrow 30.

Each of the keys of the cluster 20 are multi-function keys representing a plurality of alpha-numeric characters and/or symbols that can be typed or entered by selective actuation of said character keys, rocking keyboard, selector key and shift key by movements of one hand and movements of the fingers thereof about substantially orthogonal axes.

In accordance with the preferred embodiment, wherein the keyboard 10 is to be used with a computer, at least one further cluster of keys are provided. In the embodiment shown, two additional clusters of keys 32 and 34 are shown, the cluster of keys 32 being disposed distally in relation to the primary key cluster 20, and the key cluster 34 being disposed to the right of the key cluster 20. Additionally, an optional control key 36 is shown positioned adjacent to the shift key 28. It should be clear that the key clusters 32 and 34, as well as the control key 36, define typical keys found on computer keyboards and terminals for selecting any one of a number of different well known computer functions. The specific arrangement of the aforementioned key clusters and keys, as well as the specific functions which can be accessed, is not critical for the purposes of the present invention. Clearly, however, it is contemplated by the present invention, that a full range or assortment of functions are provided so that the keyboard can be a full-function or complete keyboard which is actuable, however, with only one hand.

As will become evident from the description that follows, each character key on the key cluster 20 represents up to 8 alpha-numeric characters and/or symbols which can be quickly and efficiently accessed or entered by the use of only one hand.

Figure 2:
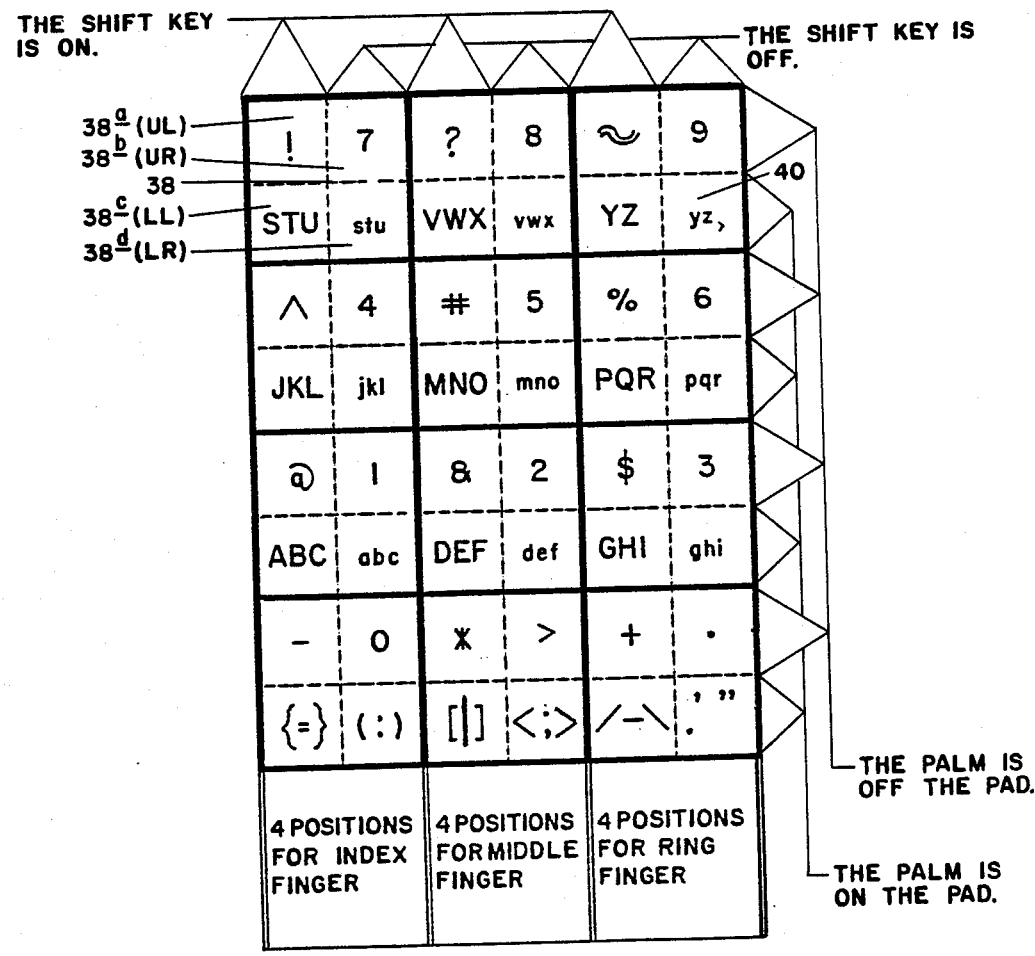
FIG. 2 is a table or chart illustrating which alphanumeric characters and/or symbols are obtained upon selective actuation of the various keys and components of the keyboard shown in FIG. 1.

Referring also to FIG. 2, the operation of the one-handed keyboard 10 will be described.

For purposes of illustration, the description will refer to the upper left-hand key 38 of the key cluster 20. In FIG. 2, the four rows and three columns of keys are diagramatically separated by solid lines. Each key, such as exemplary key 38, is divided into an upper left hand zone 38a (UL), an upper right hand zone 38b (UR); a lower left zone 38c (LL) and a lower right hand zone 38d (LR). For the key 38, thus, the UL zone 38a shows a "!"; the UR zone 38b shows the numeral "7"; the LL zone 38c shows the capital letters "S.T.U."; and the LR zone 38d shows the lower case letters "s.t.u.". As shown in FIG. 2, each of the keys of the keyboard 20 includes four such zones for the UL and UR zones depicting a numeral or symbol, while the LL and LR zones of the top three rows depict capital and lower case letters with the exception of the key 40 which depicts, in the LR zone a ",", in addition to the lower case letters "yz". The lowermost or fourth row of the keyboard 20 has various symbols in the LL and LR zones. It is pointed out, however, that while each of the UL and UR zones contain a single numeral or symbol, each of the LL and LR zones include three alpha characters and/or symbols.

To assist in the explanation of the operation of the keyboard 10, there have been placed along the upper and right hand margins or borders of the diagramatic representation of the keyboard 20 in FIG. 2, a series of triangles each of which has its vertex terminating on another line which is identified by the function or operation effected on the keyboard.

With the shift key 28 in the off or on actuated position as shown in FIG. 1, and with the palm of the hand resting on the selector key 22 to thereby depress the same from its normal upper position, it will be noted that the LR zones are enabled. Each of such LR zones include three characters and/or symbols. With the selector key in the generally level or horizontal position, the center character or symbol of the three shown in each LR zone is selected upon simultaneous pressing of the key on the keyboard 20. To select the character or symbol to the right of the center character assemble identified in each LR zone, the user must twist or turn the hand about the wrist in a generally clockwise movement to thereby rotate the selector key 22 about the longitudinal axis, as suggested by the arrows 42 thereby bringing the rocking keyboard to its right depressed position. Now, with the selector key 22 in such position, the pressing of any of the keys of the keyboard will access or enter the right character or symbol in zone LR of the selected key. Similarly, the movement of user's hand in the opposite direction, generally in the counter-clockwise direction, and in a direction opposite to that suggested by the arrows 42, causes the selector key pivot about the longitudinal axis to bring the selector key to a left depressed position. Now, actuation of any of the keys of the keyboard will select or enter the leftmost character or symbol depicted in the LR zones of the actuated keys. Thus, by rocking the keyboard between three distinct positions, the user can enter lower case letters of the alphabet and some symbols. In order to generate or enter the corresponding capital letters, the user must also actuate the shift key 28. The actuation of the shift key 28 transfers the field of operation from the LR zones to the LL zones of each of the keys of the keyboard 20. Thus, by simply rocking the keyboard 18 about the axis 14 while the hand rests on the selector key 22, any character or symbol depicted in either the LL or LR zones can be accessed or selected with the simple additional movement of the thumb for actuation of the shift key 28.

The lifting of the hand from the selector key 22 automatically causes the selector key to revert to its upper, normal and level position as shown in FIG. 1. This action changes the field of operation from the lower zones LL and LR to the upper zones UL and UR. In these upper zones, only a single numeral or symbol is depicted, so that there is no need for a rocking action of the selector key or the like for the selection of one of a number of different characters in a same zone. With the selector key 22 in the upper position, the key cluster 20 may be made suitable for use as a calculator or adding machine since the numerals 0-9 are automatically accessible in the unactuated condition of the shift key. This would merely require the addition of conventional mathematic operations keys. Therefore, by simply raising the hand of the user and releasing the shift key 28, the key cluster 20 becomes equivalent to a calculator keyboard.

In order to access or select the symbols in the UL zones, the user need merely actuate the shift key 28 while his hand is raised from the selector key 22.

Referring to FIG. 1, a template 46 is shown which depicts the symbols which correspond to the lowermost or fourth row of the key cluster 20. In FIG. 1, such lowermost row shows only the numerals and symbols shown in the upper zones UL and UR. Because of space limitations and because the lowermost row is normally covered by the fingers, it may be desirable to separately show the symbols which are available through the lowermost row by reproducing the symbols such as on template 46. Of course, if desired, it is also possible to reproduce such symbols accessible through the lower zones LL and LR on the keys themselves.

While specific embodiment has been described in detail, it is to be understood that various modifications thereof other than those suggested may be made in accordance with the present invention, which is defined by the appended claims. For example, while the selector key 22 has been shown to be mounted on the rocking keyboard 18 to share the rocking movements thereof, it is also possible to mount the selector key on the base 12 for generally vertical movements.

I claim:

1. A one-handed keyboard having a stationary base defining a longitudinal axis generally parallel to the direction of the hand and fingers of the user during use and a transverse axis generally orthogonal to said longitudinal axis; a rocking keyboard pivotally mounted on said base for rocking movement about said longitudinal axis between a normal generally level position and right and left tilted positions, said rocking keyboard having a generally horizontal surface; a cluster of generally vertically actuatable character keys spaced across said surface on said rocking keyboard actuatable by the tips of the index, middle and ring fingers of the user, each of said keys of said cluster of keys being multi-function keys representing a plurality of alpha-numeric characters and/or symbols that can be typed or entered by selective rocking movement of said rocking keyboard by movements of one hand and selective actuation of said character keys by movements of the fingers.

2. A one-handed keyboard as defined in claim 1, wherein said rocking keyboard and select key are spaced a predetermined distance from each other to permit the user to comfortably touch all said character keys with the finger tips while the palm essentially rests on said selector key, further comprising means for adjusting said distance to accommodate the size of the user's hand.

3. A one-handed keyboard as defined in claim 1, wherein the keyboard is to be used with a computer, and further comprising a second cluster of function keys on said stationary base.

4. A one-handed keyboard as defined in claim 3, further comprising a control key.

5. A one-handed keyboard as defined in claim 1, wherein character keys comprise twelve keys arranged in four rows and three columns.

6. A one-handed keyboard as defined in claim 5, wherein each character key represents eight alpha-numeric characters and/or symbols.

7. A one-handed keyboard as defined in claim 5, wherein the keyboard is arranged to provide a calculator keyboard in the normal relaxed position to said shift key and the normal upper position of said selector key.

8. A one-handed keyboard as defined in claim 1, wherein said selector key is mounted on said rocking keyboard for sharing the rocking movements thereof.

9. A one-handed keyboard as defined in claim 1, further comprising a selector key pivotally mounted for generally vertical movements about said transverse axis between a normal upper position and a lower position in response to release and depression, respectively, of said selector key by the palm of the user's hand, whereby additional alpha-numeric characters and/or symbols can be typed by selective actuation of said selector key.

10. A one-handed keyboard as defined in claim 1, further comprising a shift key on said rocking keyboard arranged to be actuated by the thumb for movements between a normal relaxed position and an actuated engaged position, whereby additional alpha-numeric characters and/or symbols can be typed by selective actuation of said shift key.

11. A one-handed keyboard as defined in claim 9, further comprising a shift key on said rocking keyboard arranged to be actuated by the thumb for movements between a normal relaxed position and an actuated engaged position, whereby additional alpha-numeric characters and/or symbols can be typed by selective actuation of said shift key.

* * * * *